(12) United States Patent
Mueller

(10) Patent No.: US 8,585,541 B2
(45) Date of Patent: Nov. 19, 2013

(54) COMBINED POWER TRANSMISSION AND DRIVE UNIT FOR USE IN HYBRID SYSTEMS AND A HYBRID SYSTEM

(75) Inventor: Bruno Mueller, Sasbach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 335 days.

(21) Appl. No.: 12/995,641

(22) PCT Filed: May 11, 2009

(86) PCT No.: PCT/DE2009/000658
§ 371 (c)(1),
(2), (4) Date: Mar. 1, 2011

(87) PCT Pub. No.: WO2009/146670
PCT Pub. Date: Dec. 10, 2009

(65) Prior Publication Data
US 2011/0154944 A1    Jun. 30, 2011

(30) Foreign Application Priority Data
Jun. 2, 2008 (DE) .......................... 10 2008 026 423

(51) Int. Cl.
*B60K 1/02*     (2006.01)
*B60K 6/42*     (2007.10)
*H02P 1/00*     (2006.01)
*H02P 3/00*     (2006.01)
*H02P 7/00*     (2006.01)

(52) U.S. Cl.
USPC ................................ 477/3; 477/7; 180/65.22

(58) Field of Classification Search
USPC ........................................ 477/3, 7; 180/65.22
See application file for complete search history.

(56) References Cited

U.S. PATENT DOCUMENTS

| | | | |
|---|---|---|---|
| 6,455,968 B2 | 9/2002 | Honorio et al. | |
| 2008/0023287 A1* | 1/2008 | Thiede et al. | 192/48.1 |
| 2008/0039281 A1* | 2/2008 | Okuda et al. | 477/73 |
| 2010/0038201 A1* | 2/2010 | Mueller et al. | 192/3.29 |
| 2010/0062899 A1* | 3/2010 | Engelmann et al. | 477/86 |

FOREIGN PATENT DOCUMENTS

| | | |
|---|---|---|
| DE | 102005034654 | 3/2006 |
| DE | 102006034945 | 4/2008 |
| EP | 1541401 | 6/2005 |
| WO | 2008141876 | 11/2008 |

* cited by examiner

*Primary Examiner* — Tisha Lewis
(74) *Attorney, Agent, or Firm* — Simpson & Simpson, PLLC

(57) ABSTRACT

A combined power transmission and drive unit for use in hybrid systems between a first engine and a transmission device, broadly including at least an input connectable with the engine, a power transmission device by which the output is connected with a transmission input shaft, a device for selectively at least interrupting/establishing the power flow to the input of the power transmission device and an electric machine including at least one rotor that is connected non-rotatably with the input of the power transmission device. Furthermore, the invention relates to a hybrid system, including a first engine and a combined power transmission and drive unit connected downstream of the engine.

37 Claims, 5 Drawing Sheets

COMBINED POWER TRANSMISSION AND DRIVE UNIT FOR USE IN HYBRID SYSTEMS AND A HYBRID SYSTEM

CROSS-REFERENCE TO RELATED APPLICATIONS

This application is the National Stage of PCT International Application No. PCT/DE2009/000658, filed May 11, 2009, which application published in German and is hereby incorporated by reference in its entirety, which application claims priority from German Patent Application No. DE 10 2008 026 423.7, filed Jun. 2, 2008, which is incorporated by reference in its entirety.

FIELD OF THE INVENTION

The invention relates to a combined power transmission and drive unit for use in hybrid systems between a first engine and a transmission device, for example, a transmission device including at least an input connectable with the engine, a power transmission device by which the output is connected with a transmission input shaft, a device for selectively at least interrupting/establishing the power flow to the input of the power transmission device and an electric machine including at least one rotor that is connected non-rotatably with the input of the power transmission device. Furthermore, the invention relates to a hybrid system, including a first engine and a combined power transmission and drive unit connected downstream of the engine.

BACKGROUND OF THE INVENTION

Hybrid systems for application in vehicles are known in a number of designs from the prior art. Common in all is that in the drive train at least two different drive units are provided, through which the drive can occur selectively or together. Furthermore, hybrid systems are in general conceived such that at least one of the engines is suitable in deceleration operation, in braking operation, or in combinations thereof, to convert the mechanical energy into a different energy form, for example, into electric energy, and to feed the latter into an accumulator. Such a hybrid system for instance is disclosed in German Patent Publication No. DE 103 10 831 A1. This reference discloses a combined power transmission and drive unit for use in hybrid systems between a first engine and a downstream transmission. The combined power transmission and drive unit includes a power transmission device that can be coupled with the transmission input shaft or includes the device and a clutch device disposed between the device and the engine that establishes or interrupts the power flow from the engine to the power transmission device. Further provided is a second engine in the form of an electric machine, which includes a rotor that can be coupled non-rotatably with the power transmission device. The device is disposed upstream of the power transmission device, viewed in the power flow direction towards the transmission. Furthermore, in the power flow between the switchable clutch device and the first engine, a dual mass flywheel is provided, by which the input is coupled non-rotatably with the crankshaft. The transmission input shaft is mounted on the crankshaft. The electric machine, viewed in axial direction, is disposed around the extension of the switchable clutch device. In addition, the switchable clutch device is disposed quasi within the diameter of the electric machine rotor. The rotor is connected non-rotatably with the housing of the clutch device or it forms an integral unit with the device. The rotor is mounted directly on the housing of the clutch device. This provides a space-saving formation for a hybrid system. Nevertheless, the assembly can be relatively complex in design. A further disadvantage is that the power transmission device and the switchable clutch device constitute devices, which during operation are surrounded by a service fluid or which require a service fluid to realize the mode of operation such that individual components are always covered with the service fluid or rotate in the fluid. Based on the depicted arrangement such that the electric machine is exposed to the service fluid of the two units, the power transmission device and the switchable clutch device, the air gap required for induction between rotor and stator can lead to the impairment of the operating mode. Furthermore, the angular displacements between the engine crankshaft and the transmission input shaft are not adjustable in the depicted form, which is the reason why high demands must be put on the production accuracy of individual components, which makes the overall unit more expensive. A test of individual component's function is possible only after complete assembly of the entire power transmission and drive unit.

BRIEF SUMMARY OF THE INVENTION

The invention is therefore based on the task to develop a combined power transmission and drive unit for use in hybrid systems, between an engine and a transmission unit, for example, the type of transmission such that the cited disadvantages are avoided. A simple assembly embodiment of the electric machine as a dry-running electric machine as well as the possibility of providing a simple implementation of the compensation of an axial offset, angular offset, or in combinations thereof, between the engine and the transmission input shaft. This invention distinguishes itself through a minor additional design effort with respect to conventional hybrid arrangements with a hydrodynamic component. The interfaces regarding the linkage to the connection elements in the hybrid system, for example, of the first engine and of the transmission input shaft must be retained.

The present invention is a combined power transmission and drive unit for use in hybrid systems between a first engine and a transmission device, broadly including at least an input connectable with the engine, a power transmission device by which the output is connected with a transmission input shaft, a device for at least selectively interrupting/establishing the power flow to the input of the power transmission device and an electric machine, including at least one rotor that is connected non-rotatably with the input of the power transmission device wherein the electric machine, the device for at least selectively interrupting/establishing the power flow from the first engine to the input of the power transmission device and the power transmission device are formed and disposed such that the devices are executed as preassembled units The power transmission device and the device for selectively interrupting/establishing the power flow to the input of the power transmission device in the mounted state are sealed with respect to the electric machine and are at least liquid tight.

The electric machine is executed as a dry-running electric machine. This permits expansion of the application spectrum and furthermore reduction of the required sealing functions. The advantage is that the combined power transmission and drive unit can be mounted in a simple manner, in that the assembly entails durable preassembled units that are prefabricated and kept in stock. These units can be tested separately in advance and therefore error analysis and remedy can occur directly on an individual assembly unit. The preassembled units thereby are disposed next to one another essentially in axial direction, connected together by simply attaching or stringing them on the transmission input shaft in a force-closed manner, a form-closed manner, or in combinations thereof. A screw-connection is also conceivable.

In one embodiment, the power transmission device and the device for partially at least interrupting/establishing the power flow between the first engine and power transmission device drive are designed and executed such that they can be combined together as a preassembled functional unit. This embodiment has the advantage of a functional unit including both partial units capable of full test, for example, besides verification of function of the power transmission device, the verification of the function of separating clutch. Furthermore, the functional unit thus created can be connected in a simple manner with the electric machine, and hence the entire assembly unit in the form of the combined power transmission and drive unit can be manufactured in modular design principle.

In another embodiment, it can be envisaged that the functional unit also includes a shaft, for example, the transmission input shaft. In this case, individual sealing functions can be fully integrated in the preassembled unit. The entire functional unit can be tested fully with respect to individual functions and be integrated in a simple manner in drive trains, for example, between an engine and transmission for the same assembly chamber requirement and without considerable modification to the connection elements.

In yet another embodiment, the other engine in the form of the electric machine is at least operable as an electric motor and as a generator. One advantage is that as a preassembled unit, the air gap available between the rotor of the electric machine and the stator can be adjusted with little dependence on tolerance. Furthermore, minimum setting magnitude is also possible because the assembly does not occur first by integration into a hybrid system where high fitting accuracy is required, but rather earlier, wherein the position between rotor and stator is already defined during the assembly. In addition, the preassembly has the advantage that the electric machine here can be tested separately also with respect to its function. Furthermore, a schematically depicted electric machine can find application. On one hand, this permits stock keeping. On the other hand, it permits using a standard machine as well as quick provision based on good availability in the case of replacement. No restrictions exist on the type of electric machines used. Application of both synchronous, as well as asynchronous, machines is possible.

The rotor of the electric machine is supported inside its stator housing. If the combined power transmission and drive unit features a housing that encloses the power transmission device, the device for at least selectively interrupting/establishing the power flow to the input of the power transmission device and the electric machine, the stator housing can be supported inside the housing of the combined power transmission and drive unit in one embodiment. In a further embodiment, the stator housing can be formed as a component of the housing of the combined power transmission and drive unit. In the aforementioned case, the housing of combined power transmission and drive unit includes several parts. Components, for example, the parts surrounding the power transmission device, can also be formed by the connected transmission in the form of the transmission bell housing.

The electric machine, for example, the rotor of the electric machine, is supported inside the housing that can correspond to the transmission housing of the transmission assembly unit or separate housing of the combined power transmission and drive unit that is connected with the transmission housing.

The power transmission device is supported directly inside the housing of the combined power transmission and drive unit, on the stator housing of the electric machine, or in combinations thereof. Preferably, the rotor of the electric machine and the power transmission device feature the same support inside the housing of the combined power transmission and drive unit, the stator housing, or in combinations thereof. This permits a simplified assembly for a highly functional concentration and minimum number of components. The support of the power transmission device is provided at the same time by means of the electric machine rotor, for example, the non-rotatable connection with the part and its support inside the housing. In addition, the linkage of the power transmission device occurs through a flexible plate on the rotor of the electric machine. The rotor of the electric machine is executed as a separate component and there is no integral embodiment with an element non-rotatably coupled with the power transmission device. The connection between the power transmission device and the rotor of the electric machine takes place by means of a connection that is executed and disposed to be suited to compensate an axial offset, an angular offset, or in combinations thereof, between the input of the device for partially at least interrupting/establishing the power flow and the engine. The connection between rotor and power transmission device includes a flexible device, for example, a flexible plate or a leaf spring connection. Thus, it can be guaranteed that the input of the device can be aligned for partially interrupting/establishing the power flow concentrically to the centering diameter of the engine/transmission housing connection.

In order to guarantee sealing with respect to the electric machine, the power transmission device includes a rotatable housing and means for sealing with respect to the electric machine. Furthermore, the device for interrupting/establishing the power flow at least partially between the engine and power transmission device includes a rotatable housing and means for sealing with respect to the electric machine. In one embodiment, the rotatable housing can be combined in an assembly, and it is then supported inside the housing of the combined power transmission and drive unit, in the stator housing, or in combinations thereof.

Several possibilities exist regarding a concrete constructive embodiment. The arrangement in axial direction, viewed between the first engine and the transmission, is a space saving arrangement. At the same time, the power transmission device and the device for partially at least interrupting/establishing the power flow between engine and power transmission device are arranged next to one another in axial direction. Functionally, the arrangement of the device for interrupting/establishing space saving the power flow in the power flow direction is connected upstream of the power transmission device between the engine and the transmission. The electric machine is disposed depending on its embodiment. This is formed and executed such that it is suited to surround an inner chamber extending in radial direction, in which the device for interrupting/establishing power flow can be disposed by forming a radial column. The electric machine is executed and disposed at the same time such that it is disposed in the axially extending section of the device for partially at least interrupting/establishing the power flow and surrounds the same in circumferential direction. In that manner, the assembly chamber in axial direction next to the power transmission device is used optimally, which is not required for the device for partially interrupting/establishing the power flow.

The power transmission device includes a component forming a hydrodynamic power split that includes at least an impeller that can be coupled at least indirectly with the input of the power transmission device and a turbine wheel that can be coupled at least indirectly with the output. The hydrodynamic component is executed either as a hydrodynamic speed/torque converter, including at least a stator or as a hydrodynamic clutch, free of a stator. The output of the power transmission device is coupled non-rotatably with the transmission input shaft or can be formed directly by the transmission input shaft. The coupling between impeller, turbine wheel, or in combinations thereof, and output can occur directly or by means of further transmission elements, for example in the form of a device for damping oscillations.

In another embodiment, the hydrodynamic component is formed as a hydrodynamic transmission in the form of a hydrodynamic speed/torque converter, additionally including at least a stator that can be stationarily supported by means of a freewheel or that can be coupled with a rotatable element. The hydrodynamic component forms a hydrodynamic power split. To bypass this hydrodynamic power split, the power transmission device further includes a device for partially bypassing the hydrodynamic power split in the power flow. This device is formed as a switchable clutch device, which can be formed in accordance with a first embodiment as a friction lock-up working clutch or in a further embodiment under certain circumstances also as a synchronously switchable clutch device. In the first case, the selective power transmission is realizable by means of the first or second power split. Furthermore, a simultaneous power transmission by means of both power splits is realizable. The device includes a first clutch part and a second clutch part wherein the first clutch part is connected indirectly non-rotatably, directly connected with the input of the power transmission device or forms an integral assembly unit with the power transmission device and the second clutch part is connected with the output indirectly, that is directly or by means of further transmission elements, e.g., by means of the device for damping of oscillations. First and second clutch part can be connected together operatively by means of an actuator. As previously mentioned, it involves friction lock-up clutches.

The power transmission device can be formed in a two-path embodiment. In this case, the device for actuating at least a partial bypass of the hydrodynamic power split, is activated by controlling the service fluids within the power transmission device and thus through the pressure ratios within the power transmission device. In another embodiment, the power transmission device can be in the form of a three-path embodiment. In this case, an additional, separate pressure chamber is provided, which can be pressurized independently of the remaining pressure chambers in the power transmission device with a control/service fluid and actuated with an actuator for the switchable clutch device, which permits a free possibility of activating the device to bypass the hydrodynamic power split.

The power transmission device includes a rotatable housing that is coupled non-rotatably with the impeller and surrounds the turbine wheel in axial direction, in radial direction, in circumferential direction, or in combinations thereof, by forming an interstice for receiving the device for partially at least bypassing the hydrodynamic power split. This housing part, which is also designated as housing bell of the power transmission device, can be executed in the preferred embodiment also as a component of the housing of the device connected upstream of the device to partially interrupt the power flow. The coupling between the individual housing can be detachable or permanent, e.g., through adhesive force.

The device for partially at least interrupting/establishing the power flow between the first engine and power transmission device is formed as a switchable clutch device. It is formed again as a wet-running clutch device with regard to the required cooling and wear. Furthermore, it can be supplied with service fluid of the power transmission device, the downstream transmission, or in combinations thereof. The embodiment is executed in multi-disk design. This likewise includes a first clutch part that is connected non-rotatably indirectly with the engine and a second clutch part that is connected with the power transmission device. The coupling with the power transmission device takes place at the same time by means of direct coupling of the second coupling part with the input of the power transmission device, the rotatable housing that serves preferably simultaneously as a component of the housing of the device for partially at least interrupting/establishing the power flow. Furthermore, this embodiment includes an actuator in the form of a piston element. The piston element is disposed in a pressure tight manner with respect to the housing or the coupling of the first coupling part and the housing by forming an interstice that can be pressurized with pressure means.

To guarantee simple coupling with the engine, the input of the combined power transmission and drive unit of a hollow shaft or a hollow shaft flange is formed, including means for generating a plug-in connection with a complementarily formed element coupled with the engine.

In one embodiment, one or several devices for damping oscillation are integrated. This concerns devices that feature means for torque transmission and means for coupling damping. Functional overlap can occur. These function as elastic clutches. A first device is connected downstream of the input of the combined power transmission and drive unit. This functions also in the decoupled operation of the engine as an absorber for the combined power transmission and drive unit. In another embodiment, this device for damping oscillations is disposed inside the housing of the device for partially interrupting/establishing the power flow to the power transmission device. The device for damping oscillation further includes the device for partially interrupting/establishing the power flow to the power transmission device in the upstream or downstream of the power flow.

The devices used in the combined power transmission and drive unit for damping oscillation can be executed according to demand and space requirement, as one of the following units: a mechanical damping device, a hydraulic damping device, or a combined mechanical and hydraulic damping device.

Damping occurs either through individual damper arrangements as one of the following functional units: a series damper, a parallel damper, series—parallel dampers, or a dual mass flywheel.

The control of individual, lower units, i.e., the power transmission device, the device for selectively at least interrupting/establishing the power flow to the input of the power transmission device and the electric machine, can take place respectively by means of a controlling/regulating device separately assigned to these units. These are generally linked together by means of a superior control.

In a further embodiment, the functions of individual controlling/regulating devices are combined in a common controlling/regulating device. The controlling/regulating device of the power transmission device can be formed at the same time advantageously by the transmission controlling/regulating device or for use in vehicles by a superior drive controlling/regulating device.

The hybrid system for use in drive trains includes a first engine and a combined power transmission and drive unit coupled with the first engine in accordance with the abovecited embodiments. The combined power transmission and drive unit forms exactly defined interfaces within the system with regard to the coupling to the engine and the transmission. Based on the embodiment as a combined power transmission and drive unit including preassembled units, the units can be tested in a simple manner prior to integration into the hybrid system.

The transmission input shaft of the combined power transmission and drive unit is free of support in the engine. Thus, in the connection between individual elements of the combined power transmission and drive unit and the engine, possibilities can be provided for compensating axial offset, angular offset, or in combinations thereof. For example, the connection occurs by means of an elastic coupling, for example, a device for damping oscillation. In normal traction operation for power supply by means of the engine, this establishes a dual mass system, wherein the first mass is disposed on the engine side and corresponds to the second mass of the combined power transmission and drive unit with downstream transmission. The large secondary mass formed herewith offers decisive advantages, for example, in traction operation.

The connection between engine/device for damping oscillations and combined power transmission and drive unit can be executed multifariously. For example, connections are selected, which are easily accessible and realizable with respect to the assembly. These are based on form-closure or force-closure. In yet another embodiment, a plug-in connection is selected.

Regarding the assembly, the embodiment of preassembled units according to the invention can be executed as follows. First, after initial testing of individual units, the power transmission device is stuck on the transmission input shaft and the transmission input shaft is connected with the transmission. Second, the device for partially interrupting/establishing the power flow to the power transmission device in the form of switchable clutch device is assembled. The housing of this is permanently connected with the housing of the power transmission device and is executed as a rotatable housing. The housing is pressure tight with respect to the electric machine. Next, the end section of the input of the power transmission device towards the flange surface can be aligned for centering the electric machine with respect to the power transmission device. In this way, a large part of the axial and angular offset between engine and transmission input shaft could be compensated. After aligning, the power transmission device is connected and fixed by means of the connection with the flexible plate or with another flexible device, e.g., a leaf spring. In this manner, a complete and testable hybrid transmission unit is obtained. The coupling with the first engine and the remaining axial offset between the flanges towards the crankshaft end are compensated through the device for damping oscillations connected upstream and spline connection.

In one embodiment, the sealing devices facing the engine are relieved as far as possible. This can be realized by means of additionally assigned-paths or tubes through which pressure relief can take place in the tank or another chamber by means of a lower pressure level.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs.

Figure 1A:
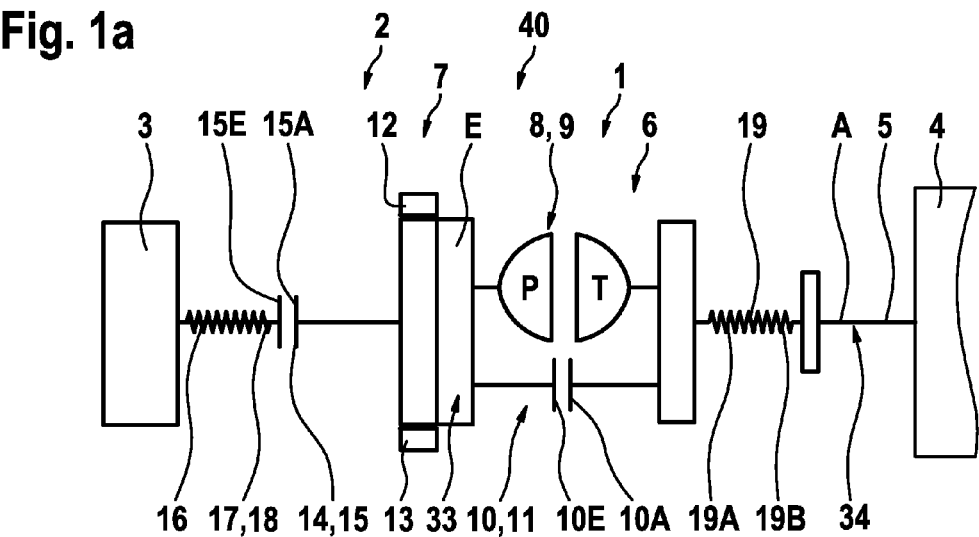
FIGS. 1a and 1b are schematic illustrations of a combined power transmission and drive unit in a hybrid system.
Figure 1B:
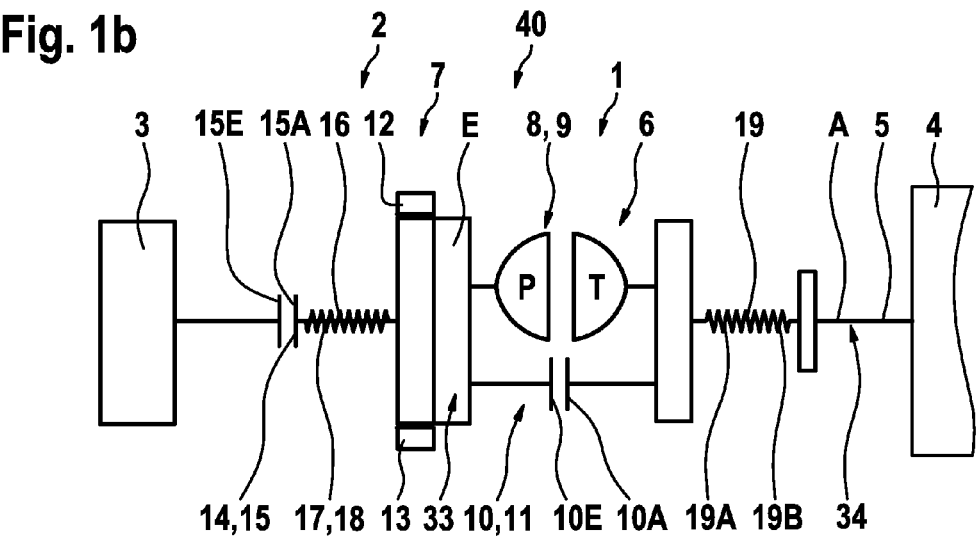

Adverting now to the figures, FIGS. 1a and 1b illustrate the basic design of hybrid system 2 on the basis of a section of drive train 40 with first engine 3 and combined power transmission and drive unit 1, which includes an engine in the form of an electric machine 7 featuring rotor 12 and stator 13. This corresponds to the second engine in hybrid system 2. Combined power transmission and drive unit 1 includes input 33 and output 34. Combined power transmission and drive unit 1 is disposed in the power flow direction between first engine 3, which is formed in the form of a combustion engine, and a receiver, in the form of transmission 4, for example, transmission input shaft 5. Second engine of hybrid system 2 is executed as electric machine 7, operable as a motor and generator. Combined power transmission and drive unit 1 further includes power transmission device 6. In hybrid system 2, power transmission device 6 can be driven both by means of first engine 3 and the second engine in the form of electric machine 7, and the drive can take place respectively alone, selectively, by means of one of engines 3, 7 or parallel by both units. Electric machine 7 is additionally operable as motor. Furthermore, electric machine 7 is operable as generator. According to the operation mode of electric machine 7, different functions arise. In motor operation, it functions as starter generator or as an additional power supply unit in addition to first engine 3. In brake operation or deceleration, electric machine 7 is operated preferably as generator. The mechanical energy transformed into electric energy can be fed into an energy accumulator or a consumption network.

Power transmission device 6 includes input E and output A. Output A is formed either directly by transmission input shaft 5 or is connected non-rotatably with transmission input shaft 5. Power transmission device 6 is a rotor connected non-rotatably with electric machine 7, and for example, with rotor 12. This connection is established through the connection of input E with electric machine 7, wherein rotor 12 is connected at least indirectly, and in some aspects, directly non-rotatably with input E.

Power transmission device 6 includes hydrodynamic component B. This features at least a primary wheel functioning as impeller P in traction operation during power transmission in drive train 40 between engine 3 and transmission 4 and a secondary wheel functioning as turbine wheel T in this operation mode. Impeller P of hydrodynamic component 8 is connected non-rotatably with input E of power transmission device 6 or it forms an integral assembly unit with the part. Hydrodynamic component 8 can be executed, for example, in the form of a hydrodynamic speed/torque converter or solely in the form of a hydrodynamic clutch. In the first mentioned case, hydrodynamic component 8 functions as transmission and serves speed conversion and torque conversion. In the second case, hydrodynamic component 8 for torque equality between impeller P and turbine wheel T only includes the possibility of speed conversion. In an embodiment as a hydrodynamic speed/torque converter, a stator is provided, that serves for speed/torque conversion. In power transmission by means of hydrodynamic component 8, this describes first hydrodynamic power split 9. Furthermore, power transmission device 6 includes device 10 for bypassing power transmission by means of first power split 9. Through which power transmission is realized through second mechanical power split 11. In addition, device 10 is formed as a lock-up clutch. This is switchable and executed as a friction lock-up clutch. Furthermore, embodiments with synchronously switchable clutches are possible. The switchable clutch device includes first clutch part 10E that is connected indirectly with input E of power transmission device 6 or that forms input E, and second clutch part 10A that is connected indirectly with output A of power transmission device 6 or forms output A, wherein both clutch parts 10E and 10A can either be brought in operational connection with one another directly or by further transmission means.

Through the coupling of rotor 12 of electric machine 7, deceleration of the part of individual power splits 9, 11 coupled with input E of power transmission device of 6 can also occur.

Electric machine 7 is connected upstream of power transmission device 6 in the power flow direction between engine 3 and transmission 4. In a preferred embodiment, the system including power transmission device 6 and electric machine 7 can selectively be coupled to or decoupled from engine 3. The coupling or decoupling occurs in the power flow upstream of electric machine 7. The coupling/decoupling is realized by means of device 14 for selectively interrupting/establishing the power flow between engine 3 and power transmission device 6. Device 14 can be switchable clutch device 15. This is disposed between engine 3 and electric machine 7 as well as between engine 3 and input E of power transmission device 6 and enables coupling to or decoupling from engine 3 of power transmission device 6. Switchable clutch device 15 includes first clutch part 15E that can be coupled indirectly or directly with engine 3 and second clutch part 15A connected with power transmission device 6.

In an embodiment of hybrid system 2 depicted in FIG. 1*a*, device 16 for damping oscillations is connected upstream of switchable clutch device 15, which includes means 17 for damper coupling and means 18 for torque transmission, for example, power transmission. At the same time, device 16 for damping oscillation can be executed in different ways. Means 17 for coupling damping and means 18 for power transmission can be realized by the same components or by different components, if necessary also with at least partial function overlap. Device 16 is for damping oscillations functions as well as elastic coupling, that is, besides damping, torque is always also transmitted. In FIG. 1*a*, device 16 is disposed between first clutch part 15E of switchable clutch device 15 and engine 3. On the other hand, in FIG. 1*b*, the device is disposed between second clutch part 15A and input E of power transmission device 6. The second possibility has the advantage that device 16 in deceleration or brake operation acts as an absorber for the mass formed by power transmission device 6, and electric machine 7, for example, by rotor 12.

In one embodiment, at least one, but possibly both power splits 9, 11 are disposed downstream of power transmission device 6 and upstream of transmission input shaft 5, damping means is disposed generally in the form of attachment 19 for damping oscillations. This includes means 19A for torque transmission and means 19B for damping oscillations.

In accordance with the invention, power transmission device 6, electric machine 7, and device 14 are disposed and executed such that they can be combined respectively as preassembled units for combined power transmission and drive unit 1. Electric machine 7 is executed corresponding to the invention as a dry electric machine, that is, it does not rotate immersed in the service fluid of the remaining components of the combined power transmission and drive unit as well as of adjoined transmission unit 4. In addition, power transmission device 6 and device 14 are executed such that they are sealed at least fluid-tightly with respect to the electric machine. This is realized through rotatable housing parts 23, 25 sealed with respect to transmission input shaft 5, wherein the parts can also be combined together in housing.

If the electric machine is executed as a dry running machine, direct cooling occurs as air-cooling. Liquid cooling can be realized by guiding the cooling medium through the stator, the rotor, or in combinations thereof.

FIGS. 1*a* and 1*b* represent schematic illustrations of respective embodiments of the present invention with respect to the disposition and coupling of individual components capable of preassembly of hybrid system 2. The disposition of individual devices 16, 19 for damping of oscillations occurs in the depicted embodiments. They can also be provided optionally.

Figure 2:
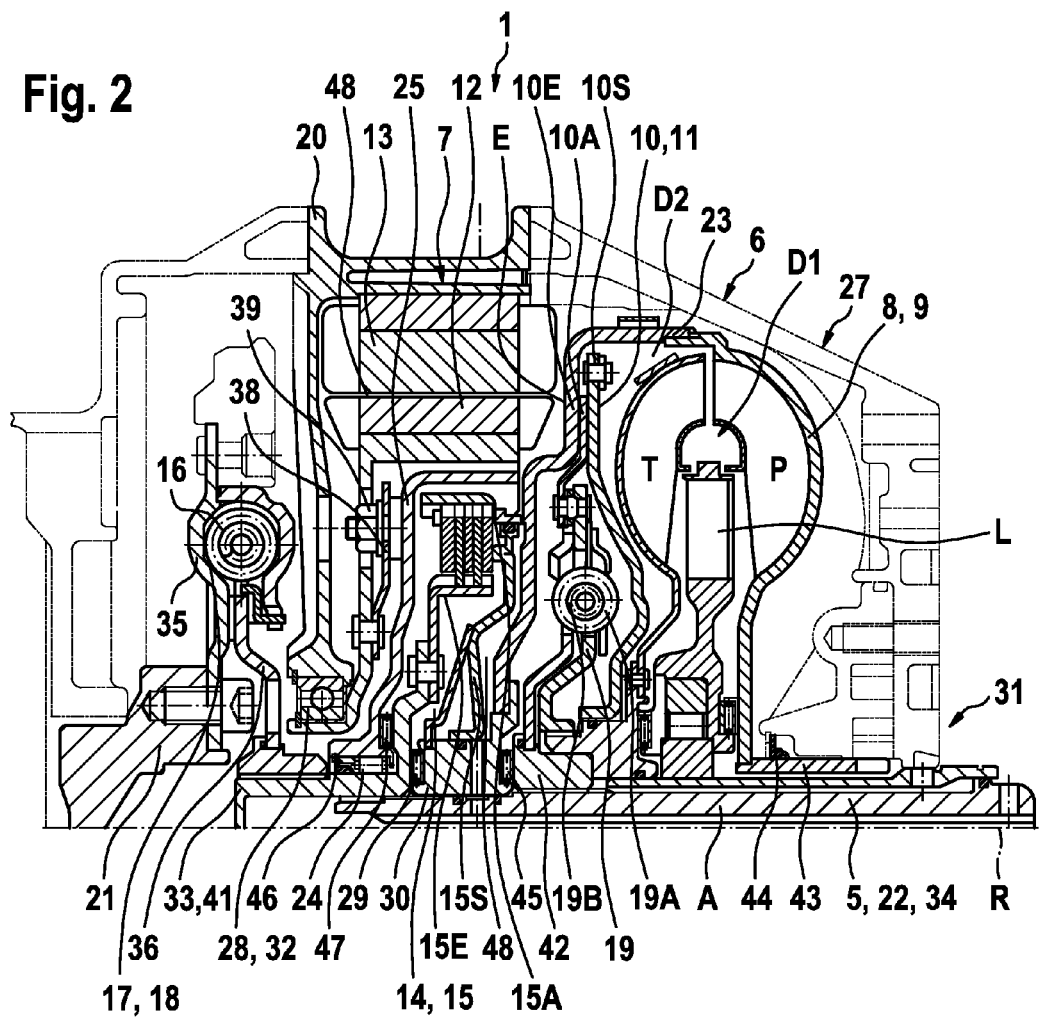
FIG. 2 is a cross-sectional view of an embodiment of the present invention.

FIG. 2 illustrates combined power transmission and drive unit 1 for use in hybrid system 2, which is applicable in drive train 40. Individual components of combined power transmission and drive unit 1, as preassembled units that are testable separately, one after another, with transmission 4, can be connected together with one another and with engine 3. The assembly of this functional unit occurs through assembly of individual preassembled units, electric machine 7, power transmission device 6 and device 14 on the functional unit of combined power transmission and drive unit 1, wherein first power transmission device 6 is connected with the transmission, subsequently device 14 is attached and connected with power transmission device 6 and finally the connection with the electric machine, for example, the rotor is established.

Combined power transmission and drive unit 1 includes input 33 that can be coupled with engine 3. Furthermore, output 34 is formed by the output A of power transmission device 6, for example, by transmission input shaft 5. Input 33 is formed by device 14, for example, by first clutch part 15E of switchable clutch device 15 or an element connected non-rotatably with hollow shaft 41 closed on one side. This is supported in the first clutch part and positioned by means of the flexible connection between rotor and power transmission device 6.

In another embodiment, electric machine 7 is formed as already executed, that is, works freely from the oil sump. Power transmission device 6 is formed, based on its functional method, as a wet-running device, for example, based on hydrodynamic component B. Device 14 in the form of switchable coupling 15 is preferably executed also as wet-running clutch device 15. Thus, the components involved in the power transmission at least during their operation mode are surrounded by a service fluid, for example, oil. This service fluid also remains in these components when they are not activated. The formation of power transmission device 6 as well as device 14 for partially interrupting/establishing the power flow between power transmission device 6 and engine 3, whereby, although not depicted, are independently testable assembly units. Both can be mounted separately as preassembly units or as one unit. The latter solution has the advantage that components for both units are useful, for example, partitions and housing components.

Device 14 in the form of switchable clutch device 15, for example, in the form of wet clutch includes rotatable housing 25, which is pressure tight and fluid tight with respect to electric machine 7. Rotatable housing 25 is supported at the same time indirectly by means of the flexible device in the form of flexible plate 38 and bearing device 28 inside stator housing 20 of the electric machine. Hollow shaft 41 is supported by means of bearing device 24 inside rotatable housing 25. Rotatable housing 25 is connected rigidly with rotatable housing 23 of power transmission device 6. Housing 23 of power transmission device 6 is formed by the housing part coupled non-rotatably with impeller P, for example, an impeller shell that surrounds turbine wheel T in axial direction, in circumferential direction and in radial direction by forming axial interstice 26. In interstice 26, device 10, in the form of switchable clutch device, is the lock-up clutch.

Housing 23 executed in the form of housing bell, with a part of its housing wall, forms a part of housing 25 of device 14. Housing 23 in this area is connected with hub 30.

Electric machine 7 can be preassembled as an assembly unit, wherein it can be integrated inside housing 27. Electric machine 7 includes rotor 12 and stator 13, wherein stator 13 surrounds the rotor in circumferential direction and in radial direction by forming air gap 48. The embodiment as an assembly unit has the advantage that efficiency-relevant gap 48 between rotor 12 and stator 13 can be minimized or at least made more accurate.

Rotor 12 of electric machine 7 is connected non-rotatably with rotatable housing 23 of power transmission device 6 by means of its non-rotatable connection with housing 25 and furthermore is supported on stator housing 20 that is braced at least indirectly, for example, directly, either inside housing 27 of combined power transmission and drive unit 1 or, for multipart embodiment, is an integral component of housing 27. The support at the same time occurs by means of bearing device 28. The arrangement of electric machine 7 occurs preferably in radial direction such that this surrounds device 14 as a preassembly unit in radial direction and in circumferential direction, wherein the extension occurs in axial direction when viewed between engine 3 and transmission 4 essentially in the axial extension area of device 14 in the form of wet-running clutch device 15. The support occurs on a stationary housing part. In this way, it is possible to execute rotatable housing 23, 25 in pressure tight and liquid tight manner with respect to electric machine 7. This occurs in the simplest case by means of sealing devices that can be executed both as axial and radial seals. The sealing takes place by means of sealing devices 44 between pump neck 43 and housing 27 and sealing devices 46 between input 33 of combined power transmission and drive unit 1 and housing 25.

In analogy, power transmission device 6 as well as device 14 can be executed against each other as pressure tight, liquid tight, or in combinations thereof. Individual components can be constructed, preassembled and tested in a simple manner as separate components. Further sealing devices serve for separation of individual pressure chambers.

Axial bearings 45 between housing 23 and transmission input shaft 5, for example hub 30 and the elements of power transmission device 6, axial bearing 47 between rotatable housing 25 of device 14 as well as first clutch part 15E and axial bearing 29 between first clutch part 15E and transmission input shaft 5, for example, hub 30 are visible.

Transmission input shaft 5 here is formed directly by output shaft 22 forming the output of power transmission device 6. Viewed in the power flow sense, this is disposed downstream corresponding to the embodiment in FIG. 2 of device 10 in the form of a switchable clutch device as well as hydrodynamic component 8 through interposition of device 19 for damping oscillations.

Hydrodynamic component 8, for example, power transmission device 6 is supported on at least two bearing points 31 by means of pump neck 43 inside housing 27 and by means of flexible plate 38 together with rotor 12 of the electric machine inside stator housing 20, which is designated as bearing point 32. In addition, the connection between rotor 12 and power transmission device 6 in the area of housing 25 by means of flexible plate 38 that is coupled by means of connection means 39 with housing 25. This elastic linkage allows axial movability. The compensation of axial offset, angular offset, or in combinations thereof, between engine 3, for example, crankshaft 21 and transmission input shaft 5 occurs through deflection of the housing from the middle position, such that it then lies obliquely between bearing point 31 and input 33.

Transmission input shaft 5 is free of support inside crankshaft 21. This means, it has no support on crankshaft 21 on the drive side when observed in normal traction operation in power flow direction. The coupling between crankshaft 21 and input 15E of switchable clutch device 15 at the same time by means of hollow shaft 41 that is connected non-rotatably with clutch input 15E or forms clutch input 15E. This is braced in rotatable housing 25. The coupling of rotatable housing 25 on housing 23 occurs here for example in the form of permanent connection, a welded connection. However, connections in the form of screws are also possible. The support of transmission input shaft 5 on the side of engine 3 occurs by means of housing 23 and its support inside stator housing 20 or transmission housing 27, if applicable.

The connection between coupling input 15E of the wet-running multi-plate clutch and crankshaft 21, and thus, engine 3, occurs preferably indirectly, but rather by means of device 16 for damping oscillations, e.g., in the form of a dual-mass-flywheel, a hydraulic damper, a mechanical damper or a combined hydraulic-mechanical damper. This includes primary part 35 and secondary part 36 that are rotatable with respect to one another in circumferential direction and are interconnected by means for damping and torque transmission 17, 18. In this way, an elastic coupling is formed, by means of which an angular offset, axial offset, or in combinations thereof, of the drive train parts to be connected can be compensated relative to one another. The coupling of secondary part 36 with device 14 occurs force-closed or form-closed. At the same time, in the preferred embodiment, the means for compensating axial offset or angular offset can be integrated inside device 16.

The coupling with crankshaft 21 occurs force-closed or form-closed. This applies also to the coupling with device 12. In one embodiment, the connection between engine 3 and combined power transmission and drive unit 1 is realized by means of a stick-on connection.

Switchable clutch device 15 is formed as a multi-plate clutch. The individual plates are brought together into operational connection by means of actuator 15S. Actuator 15S is formed as a piston element guided movably in axial direction in a pressure tight manner with respect to transmission input shaft 5 and housing 25, wherein the guide can occur either directly on transmission input shaft 5 or on an element braced on transmission input shaft 5, for example, on hub part 30 coupled non-rotatably with the housing. The piston element is guided furthermore on the external plate carrier. In this way, separate pressure chamber D15 is formed for pressurizing actuator 15S. This features a connection, not depicted, to a tank in order to relieve the seals outwards. Furthermore, pressure chamber D15 can be filled by leakage from the piston chamber in which the piston is guided, or from power transmission device 6.

Figure 4:
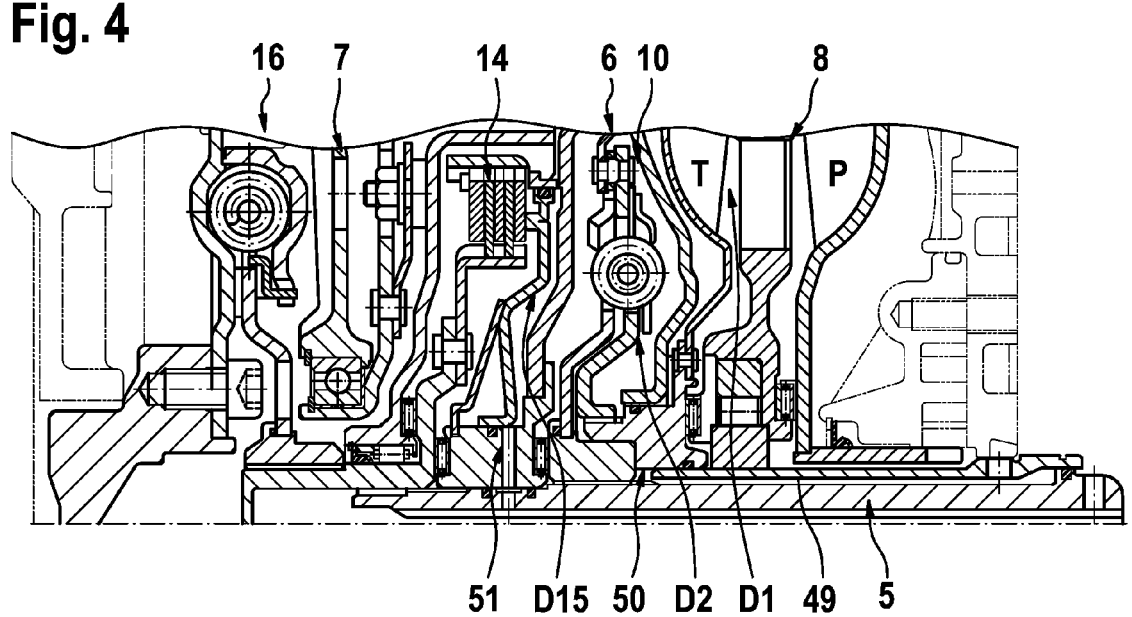
FIG. 4 is a partial, cross-sectional view of another embodiment of the present invention, illustrating the two-path design.
Figure 5:
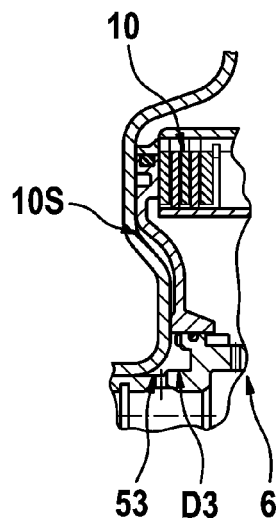
FIG. 5 is a partial, cross-sectional view of yet another embodiment of the present invention, showing the three-path design; and, FIGS. 6a and 6b are schematic illustrations, depicting possible assignments of the controls.

There are multiple possibilities as to how hydrodynamic component 8 and device 10 assigned to it, partially bypass hydrodynamic power split 9, for example, the lock-up clutch. This is also associated with the concrete functional manner and operational manner of power transmission device 6. The hydrodynamic speed/torque conversion or the hydrodynamic clutch as depicted in FIGS. 2 and 4 can be executed in two-path design or in three-path design as depicted in FIG. 5 of the section. The two-path design in FIGS. 2 and 4 includes two pressure chambers that are formed within power transmission device 6, designated D1 and D2. First pressure chamber D1 is formed by the work chamber formed between impeller P and turbine wheel T of hydrodynamic component 8. Second pressure chamber D2 corresponds to inner chamber 26 surrounded by housing 23. Both are assigned to corresponding connections 49, 50. According to hydrodynamic component 8 and flow direction, that is centripetal or centrifugal flow through hydrodynamic component 8, circulation is generated and acts on the components of device 10. In normal operation of hydrodynamic component 8, that is, power transmission by means of hydrodynamic component 8, the flow through occurs centripetally, that is, the service fluid is fed from the outside circumferential area in radial direction inside the work chamber of hydrodynamic component 8. In this case, the flow of service fluid is used simultaneously in order to separate individual clutch parts 10E and 10A of the switchable clutch device and hold the clutch device in unactuated state. In this operation mode, the power transmission takes place essentially by means of hydrodynamic component 8 or completely by means of hydrodynamic component 8. If the flow direction is reversed, for example, if the power transmission by means of hydrodynamic component 8 interrupted, based on the pressure inside interstice 26, which is then greater than that in the work chamber of hydrodynamic component 8, it will be used simultaneously to activate actuator 10S in the form of a piston element of the switchable clutch device. Preferably, a separate piston will be forgone in that the piston is used simultaneously as clutch part 10A. Thus, a frictional closure is obtained and the lock-up clutch closed.

FIG. 5 illustrates an embodiment for a three-path design, wherein a separate pressure chamber D3 for pressurizing actuator 105 of device 10 is provided for partially at least bypassing hydrodynamic power split 9 and pressure chamber D3 for pressurizing actuator 10S is separate, i.e., controllable independently of the pressure ratios in the remaining pressure chambers D1, D2 of power transmission device 6.

The arrangement of all components occurs here in axial direction adjacently to one another, wherein the arrangement of the electric machine preferably occurs such that in radial direction the interior diameter of rotor 12 formed by a ring-shaped element free from assembly units includes integration of assembly units, for example, by integration of wet-running clutch device 15. All drive-side parts of switchable clutch device 15 are supported on the front of housing 25.

In FIG. 2, the hydrodynamic component, for example, power transmission device 6 and device 14 are preassembled and testable and can be mounted on transmission input shaft 5.

The depicted pressure chambers and seals are advantageous embodiments. It is obvious that depending upon the arrangement of the sealing devices and of the desired relief effect, additional-paths can be provided.

Figure 3A:
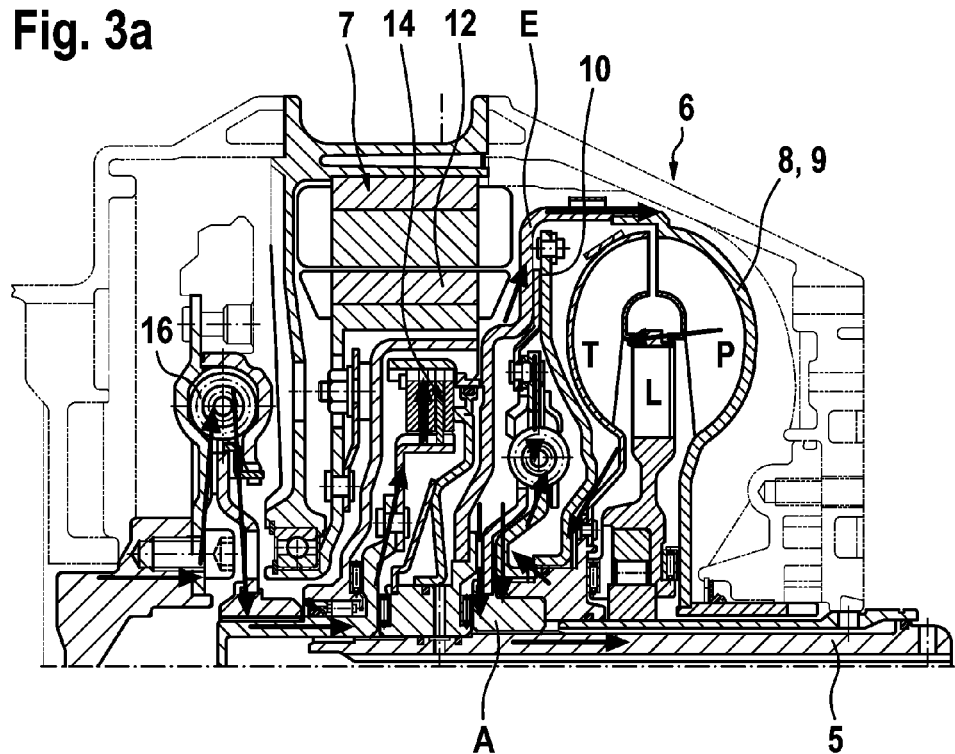
FIGS. 3a through 3d are cross-sectional views of the present invention, depicting varying modes of operation.

FIG. 3*a* is a cross-sectional view of the present invention, showing the power flow for drive by engine 3 alone, based on the embodiment depicted in FIG. 2. Device 14 is closed, and it allows power flow to power transmission device 6. Power transmission takes place according to the operation mode either by means of hydrodynamic power split 9, i.e., by means of hydrodynamic component 8, or by means of mechanical power split 11, i.e., device 10, which is clarified by means of interrupted line. Parallel operation is also possible, i.e., the simultaneous power transmission by means of both splits 9, 11.

Figure 3B:
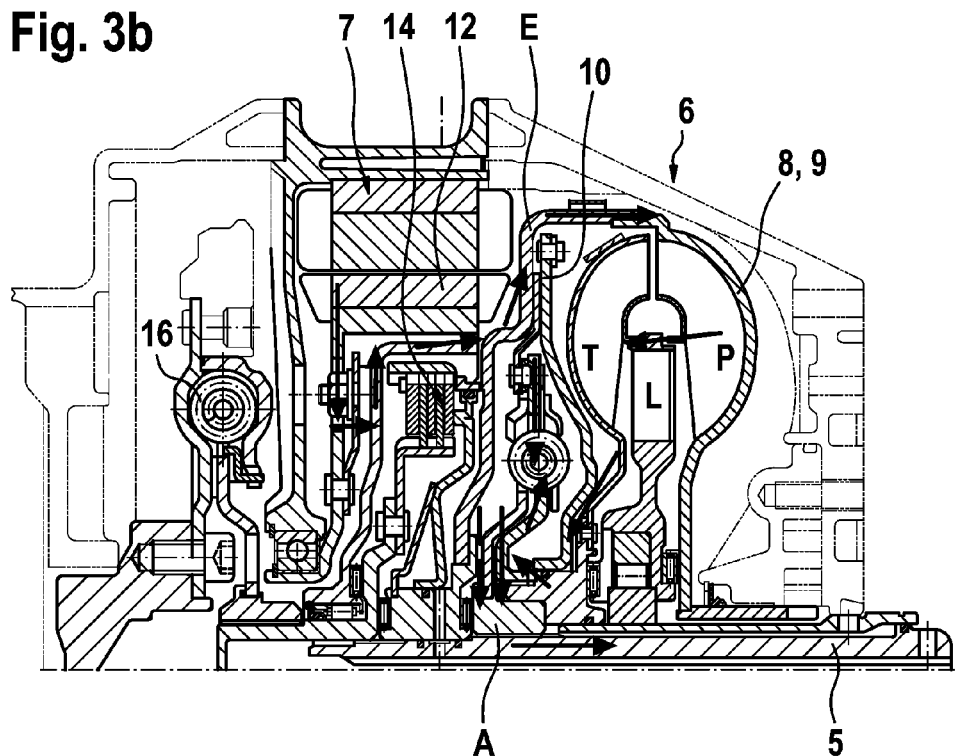

FIG. 3*b* is a cross-sectional view of the present invention, illustrating the power flow in the purely electric driving operation. In this case, switchable clutch device 15 is deactivated. The power flow between engine 3 and transmission input shaft 5 is interrupted. The drive can take place solely by means of electric machine 7. For example, the rotor is coupled non-rotatably with input E in the form of housing 25 of the power transmission device, such that the power flow from the rotor of the electric machine is fed directly to power transmission device 6 or into impeller P of hydrodynamic component 8. This facilitates the drive of turbine wheel T that is again connected non-rotatably with transmission input shaft 5, in this case by means of device 19 for damping oscillations. In addition, an operation mode of power transmission device 6 wherein power transmission by means of second power split 11 is conceivable for driving with electric means. In this case, device 10 is closed, that is, the lock-up clutch is activated and first power split 9, that is, the hydrodynamic component is bypassed. The drive takes place directly by means of first clutch part 10E coupled non-rotatably by means of housing 25, here force-closed. Coupling 10 is connected also with transmission input shaft 5 by means of device 19 for damping oscillations. The coupling occurs here through the non-rotatable coupling by means of means 18 for torque transmission of device 19 for damping oscillations.

In another embodiment, electric machine 7 in this configuration can also be used as a brake device in which it is operable in the counter-flow principle.

Figure 3C:
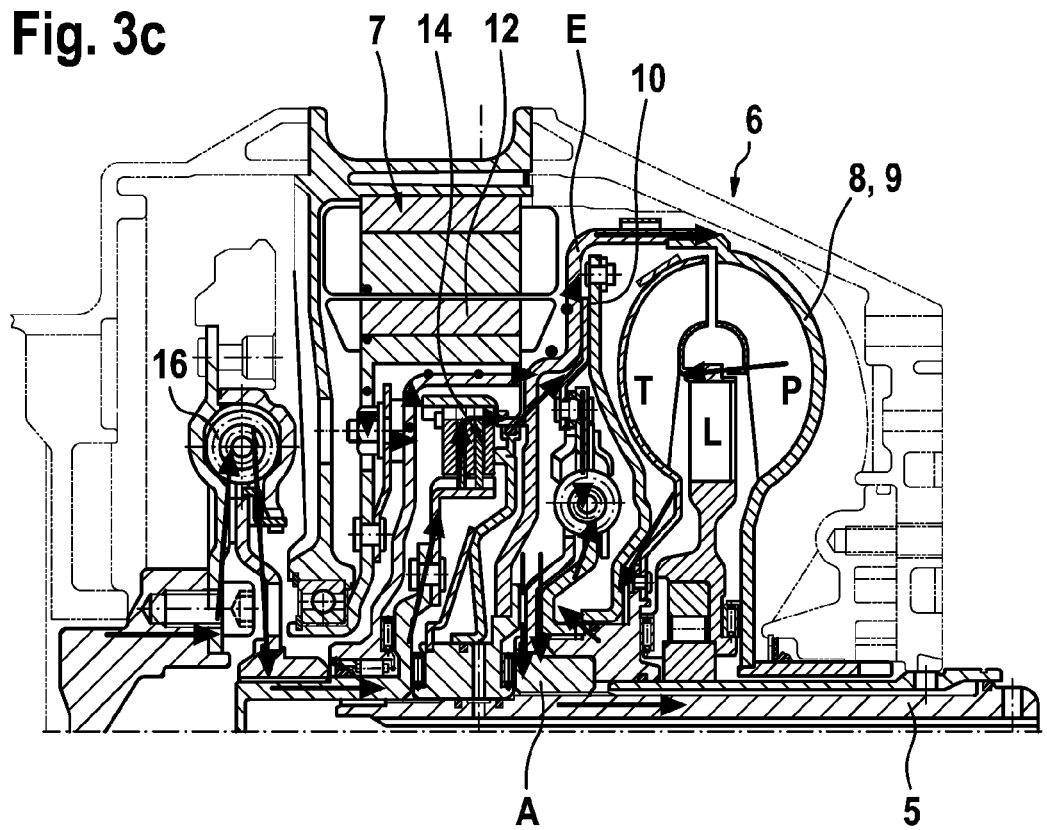

In yet another embodiment in FIG. 3*c*, also a combined operation mode of mechanical drive and electric drive is conceivable. In this case, power transmission between engine 3 and power transmission device 6 occurs. Switchable clutch device 15 in the form of wet running coupling is closed. In addition, the drive here can be supported by electric machine 7. Both engines 3, 7 work in parallel, wherein power transmission device 6 then functions quasi as a pick-off transmission.

Figure 3D:
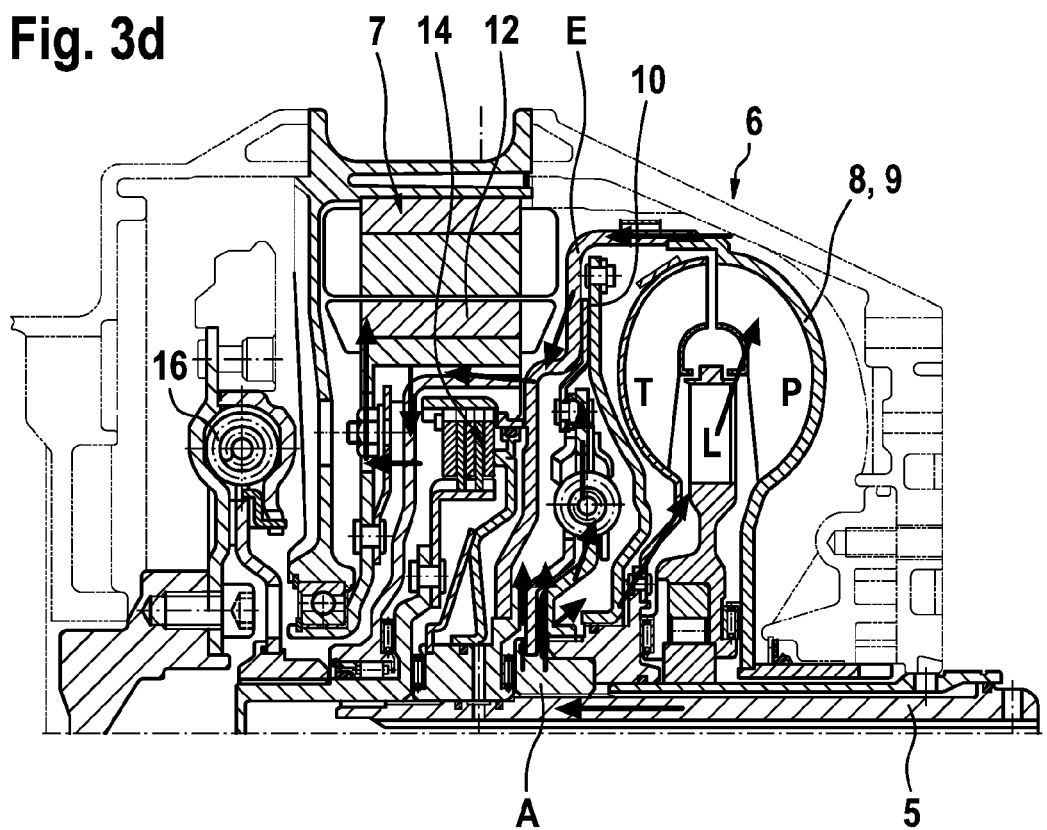

FIG. 3d is a cross-sectional view of the present invention, depicting the operation of electric machine 7 in generator mode, and therefore, additionally feeding electric power into an accumulator, not shown in this figure. For example, this is the case in the combustion operation mode. At the same time, in the deceleration mode, viewed in power transmission direction from transmission input shaft 5 towards engine 3, the power in power transmission device 6 is either fed by means of hydrodynamic component 8 towards rotor 12 of electric machine 7 or by means of device 10 formed as a lock-up clutch device.

In the operation mode shown in FIGS. 3a and 3c, a mass distribution is attained, which includes a primary mass and a secondary mass, wherein the primary mass is formed by the element coupled with engine 3, and the secondary mass from the masses of device 14, rotor 12 and power transmission device 6.

Figure 6A:
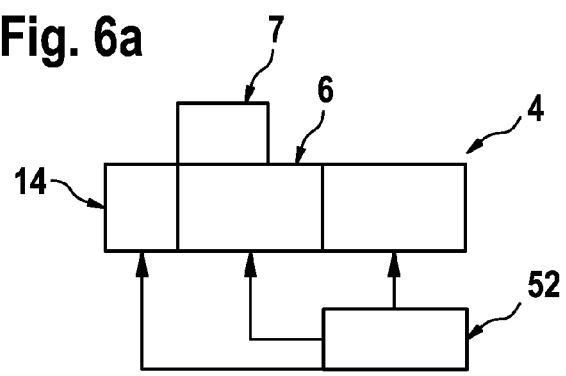
Figure 6B:
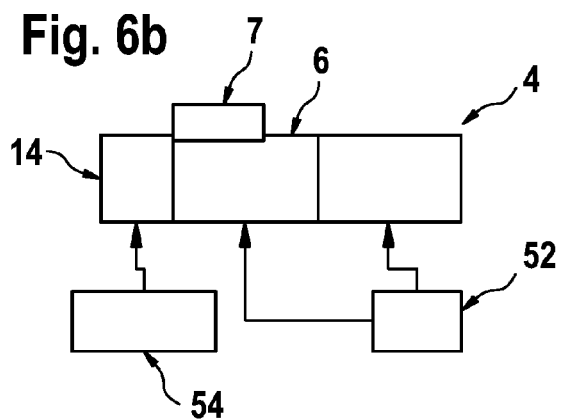

FIGS. 6a and 6b are schematic illustrations, depicting different embodiments of controlling the individual functional units of combined unit 1. At the same time, controlling/regulating unit 52 is assigned to the transmission. In one embodiment, controlling combined power transmission and drive unit 1, for example, power transmission device 6 and device 14, is also provided for.

On the other hand, FIG. 6b shows another embodiment with separate control of device 14 by means of inherent controlling/regulating device 54. This can occur from the engine control or a superior driving control when using combined power transmission and drive unit 1 in vehicles.

FIGS. 1 through 6b represent embodiments of the present invention. The formation of combined power transmission and drive unit 1 from preassembled units is not restricted to the depicted embodiments. The embodiments can vary with respect to the arrangement of the individual paths for relieving the seals. These are generally guided through the transmission input shaft into a tank.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE SYMBOLS 1 the combined power transmission- and drive unit
2 hybrid system
3 engine
4 transmission
5 transmission input shaft
6 power transmission device
7 electric machine
8 hydrodynamic component
9 first power split
10 device for bypassing the first power split
11 second power split
12 rotor
13 stator
14 device for interrupting the power flow
15 switchable clutch device
15E clutch input
15A clutch output
16 device for damping oscillations
17 means for coupling damping
18 means for power transmission
19 device for damping oscillations
20 stator housing
21 crankshaft
22 output shaft
23 rotatable housing
24 bearing device
25 housing
26 interstice
27 transmission housing
28 bearing device
29 axial bearing
30 hub
31 bearing point
32 bearing point
33 input of the combined power transmission- and drive unit
34 output of the combined power transmission- and drive unit
35 primary part
36 secondary part
37 hub
38 flexible plate
39 connection means
40 drive train
41 hollow shaft
42 hub
43 pump neck
44 sealing device
45 axial bearing
46 sealing device
47 axial bearing
48 air gap
49 connection
50 connection
51 connection
52 controlling/regulating device
53 connection
54 controlling/regulating device
P impeller
T turbine
E input
A output
R rotation axis
D1 pressure chamber
D2 pressure chamber
D3 pressure chamber
D15 pressure chamber

I claim:

1. A combined power transmission and drive unit for application in hybrid systems comprising:
an input connectable with a first engine;
a power transmission device, by which an output is connected with a transmission input shaft;
a device for selectively interrupting/establishing a power flow from the input of the combined power transmission and drive unit to the power transmission device; and,
an electric machine, comprising a rotor, which is connected non-rotatably with an input of the power transmission device, wherein the electric machine is a dry running machine and the electric machine, the device for selectively interrupting/establishing the power flow to the power transmission device and the power transmission device are formed and disposed such that they are preassembled units, and wherein the power transmission device and the device for selectively interrupting/establishing the power flow to the input of the power transmission device are liquid-tight relative to the electric machine, wherein:
the power transmission device comprises a hydrodynamic component, forming a hydrodynamic power split, which comprises an impeller that can be coupled indirectly with the input of the power transmission device and a turbine that can be coupled indirectly with the output; and
the combined power transmission and drive unit is formed as a three-path unit, comprising:
a first pressure chamber enclosed by the hydrodynamic component in the form of a work chamber;
a second pressure chamber in which the device for partially bypassing the hydrodynamic power split is disposed; and,
a third pressure chamber on which the actuator of the device for partially bypassing the hydrodynamic power split is disposed, wherein each of the pressure chambers is assigned to a connection which is sealed against the third pressure chamber pressurizing the actuator relative to the first and second pressure chambers.

2. The combined power transmission and drive unit recited in claim 1, wherein the rotor of the electric machine is supported in a stator housing of the electric machine.

3. The combined power transmission and drive unit recited in claim 2, further comprising a first housing enclosing the power transmission device, the device for selectively interrupting/establishing the power flow to the input of the power transmission device and the electric machine, wherein the stator housing is supported inside the first housing.

4. The combined power transmission and drive unit recited in claim 2, further comprising a first housing that encloses the power transmission device, the device for selectively interrupting/establishing the power flow to the input of the power transmission device and the electric machine, wherein the stator housing:
is a component of the first housing; or,
forms components of the first housing of a second housing of an at least one downstream transmission; or,
is a component of the first housing and forms components of a second housing of a combined power transmission and drive unit of housing of an at least one downstream transmission.

5. The combined power transmission and drive unit recited in claim 3, wherein the first housing is a single piece.

6. The combined power transmission and drive unit recited in claim 4, wherein the first housing of the combined power transmission and drive unit is in several parts.

7. The combined power transmission and drive unit recited in claim 2, wherein the power transmission device is supported directly:
inside the housing of the combined power transmission and drive unit; or,
inside the stator housing of the electric machine.

8. The combined power transmission and drive unit recited in claim 7, wherein the power transmission device and the rotor of the electric machine are supported by means of a bearing device:
inside the housing of the combined power transmission and drive unit; or,
inside the stator housing.

9. The combined power transmission and drive unit recited in claim 2, wherein the transmission input shaft is supported by means of the power transmission device: inside the housing of the combined power transmission and drive unit; or,
inside the stator housing.

10. The combined power transmission and drive unit recited in claim 1, wherein the device for selectively interrupting/establishing the power flow to the input of the power transmission device and the power transmission device are combined in one assembly.

11. The combined power transmission and drive unit recited in claim 10, wherein the transmission input shaft is a component of a preassembled assembly and forms the output of the power transmission device.

12. The combined power transmission and drive unit recited in claim 1, wherein the power transmission device comprises a rotatable housing and means for sealing it against the electric machine.

13. The combined power transmission and drive unit recited in claim 1, wherein the device for partially interrupting/establishing the power flow to the input of the power transmission device comprises a rotatable housing and means for sealing against the electric machine.

14. The combined power transmission and drive unit recited in claim 1, further comprising a rotatable housing of the device for partially interrupting/establishing the power flow to the input of the power transmission device and a housing of the power transmission device combined to form one component that is supported:
inside the housing of the combined power transmission and drive unit; or,
inside a stator housing; or,
inside a housing of the combined power transmission and drive unit and inside the stator housing.

15. The combined power transmission and drive unit recited in claim 1, wherein the connection between the power transmission device and the rotor of the electric machine occurs by means of a flexible, axially movable connection.

16. The combined power transmission and drive unit recited in claim 15, wherein the connection comprises a flexible device, including:
a flexible plate; or,
a leaf spring device; or,
a flexible plate and a leaf spring device.

17. The combined power transmission and drive unit recited in claim 1, wherein the hydrodynamic component is a hydrodynamic speed/torque converter, comprising a stator.

18. The combined power transmission and drive unit recited in claim 1, wherein the power transmission device comprises a device for partially bypassing the hydrodynamic power split.

19. The combined power transmission and drive unit recited in claim 18, wherein the device for partially bypassing the hydrodynamic power split is formed as a switchable clutch device, comprising:
a first clutch part that:
can be coupled with the power transmission device; or,
forms the input of the power transmission device; and,
a second clutch part of the power transmission device that:
can be coupled with the output of the power transmission device; or,
forms the output of the power transmission device, wherein the first and second clutch parts can be brought into operational connection with one another:
by means of an actuator directly; or,
by means of further transmission elements.

20. The combined power transmission and drive unit according claim 1, wherein the power transmission device is formed as a two-path unit, comprising:
a first pressure chamber formed by the hydrodynamic component in the form of a work chamber; and, a second pressure chamber formed between the rotatable housing and an outside circumference of the hydrodynamic component, in which the device for partially bypassing the hydrodynamic power split is arranged, wherein each one of the pressure chambers is assigned to a connection, and the control of the device takes place through the control of:

a flow direction; or, a pressure difference between the pressure chambers; or, a flow direction and a pressure difference between the pressure chambers.

21. The combined power transmission and drive unit recited in claim 1, further comprising a rotatable housing of the power transmission device forms the input of the power transmission device and the rotor:

is connected indirectly by means of a housing of the device for partially interrupting/establishing the power flow to the power transmission device; or, is connected directly with the rotatable housing of the power transmission device.

22. The combined power transmission and drive unit recited in claim 1, wherein the device for interrupting/establishing the power flow is a wet-running multi-plate clutch, comprising:

a first clutch part forming the input of the combined power transmission and drive unit; or, a second clutch part connected non-rotatably with the power transmission device, which can be brought into operational connection with one another by means of an actuator either:

indirectly; or, directly; or, by means of further transmission means.

23. The combined power transmission and drive unit recited in claim 1, wherein the input of the combined power transmission and drive unit is formed by a hollow shaft flange, which comprises the means for generating a stick-on connection with a complementary element coupled with the first engine.

24. The combined power transmission and drive unit recited in claim 1, further comprising a device for damping oscillations, the device connected downstream of the input of the combined power transmission and drive unit.

25. The combined power transmission and drive unit recited in claim 24, wherein the device for damping oscillations of the device for partially interrupting/establishing the power flow to the power transmission device is connected downstream from the device for selectively interrupting/establishing a power flow from the input of the combined power transmission and drive unit to the power transmission device.

26. The combined power transmission and drive unit recited in claim 1, further comprising a device for damping oscillations, the device connected downstream of the power transmission device.

27. The combined power transmission and drive unit recited in claim 1, further comprising a device for damping oscillations, the device is connected downstream in the power transmission device in a power split.

28. The combined power transmission and drive unit recited in claim 1, further comprising devices for damping oscillations, the devices being one of the following units:

a mechanical damping device; or, a hydraulic damping device; or, a combined mechanical and hydraulic damping device; or, a series damper; or, a parallel damper; or, a series-parallel damper; or, a dual-mass flywheel.

29. The combined power transmission and drive unit recited in claim 1, wherein the rotor of the electric machine in an axial extension area of the device for selectively interrupting/establishing the power flow to the power transmission device is disposed and encloses the rotor in circumferential direction by forming a gap.

30. The combined power transmission and drive unit recited in claim 1, wherein the power transmission device and the device for selectively interrupting/establishing the power flow to the power transmission device are assigned respectively to a separate controlling/regulating device.

31. The combined power transmission and drive unit recited in claim 1, wherein the power transmission device and the device for selectively interrupting/establishing the power flow to the power transmission device are assigned to a joint controlling/regulating device.

32. The combined power transmission and drive unit recited in claim 30, wherein the controlling/regulating device of the power transmission device is formed by the transmission controlling/regulating device.

33. The combined power transmission and drive unit recited in claim 1, further comprising a hybrid system for use in a drive train, wherein the first engine can be coupled with the combined power transmission and drive unit.

34. The hybrid system recited in claim 33, wherein the transmission input shaft is free of support inside the first engine.

35. The hybrid system recited in claim 33, wherein the connection between the combined power transmission and drive unit and the first engine is:

a form-closed connection; or, a force-closed connection.

36. The hybrid system recited in claim 33, wherein the connection between the combined power transmission and drive unit and the first engine is executed a plug-in connection.

37. The hybrid system recited in claim 33, wherein the connection between the combined power transmission and drive unit and the first engine occurs by means of a device for damping oscillations.

* * * * *